(12) United States Patent
Xu et al.

(10) Patent No.: US 11,974,193 B2
(45) Date of Patent: Apr. 30, 2024

(54) DATA PROCESSING METHOD AND APPARATUS, SERVER, AND COMPUTER-READABLE STORAGE MEDIUM

(71) Applicant: ZHEJIANG SOTEREA TECHNOLOGY GROUP LMITED COMPANY, Hanghzou (CN)

(72) Inventors: Xianjie Xu, Hanghzou (CN); Haixin Zhao, Hanghzou (CN); Weiting Zhao, Hanghzou (CN)

(73) Assignee: ZHEJIANG SOTEREA TECHNOLOGY GROUP LMITED COMPANY, Hanghzou (CN)

(*) Notice: Subject to any disclaimer, the term of this patent is extended or adjusted under 35 U.S.C. 154(b) by 0 days.

(21) Appl. No.: 18/362,996

(22) Filed: Aug. 1, 2023

(65) Prior Publication Data
US 2024/0022876 A1    Jan. 18, 2024

Related U.S. Application Data

(63) Continuation of application No. PCT/CN2021/124369, filed on Oct. 18, 2021.

(30) Foreign Application Priority Data

Feb. 4, 2021    (CN) .......................... 202110153361.X (51) Int. Cl.
*H04W 4/44*    (2018.01)
*H04W 4/029*    (2018.01)

(52) U.S. Cl.
CPC ............. *H04W 4/029* (2018.02); *H04W 4/44* (2018.02)

(58) Field of Classification Search
CPC ..... G06Q 50/30; G06F 16/29; G06F 16/9537; G06F 11/0748; G06F 16/2455; H04W 84/18; H04W 4/029
See application file for complete search history.

(56) References Cited

U.S. PATENT DOCUMENTS

| | | | |
|---|---|---|---|
| 2015/0234897 A1 | 8/2015 | Kuninobu et al. | |
| 2020/0081666 A1 | 3/2020 | Asai | |

(Continued)

FOREIGN PATENT DOCUMENTS

| | | |
|---|---|---|
| CN | 111721299 A | 9/2020 |
| CN | 112507251 A | 3/2021 |

OTHER PUBLICATIONS

Su Weijia; et al., Applications of electronic technology, Wireless data acquisition system of GSM based on TC35I, 2009, pp. 88-90, Issue 12, China.

*Primary Examiner* — Khalid W Shaheed
(74) *Attorney, Agent, or Firm* — True Shepherd LLC; Andrew C. Cheng (57) ABSTRACT

A data processing method and apparatus, a server, and a computer-readable storage medium are disclosed in the present application. The data processing method includes: obtaining positioning data of a moving object from a message queue cluster; comparing collection time of the positioning data with target collection time when frequency-reduction data to be determined is not arranged first, where the target collection time is determined according to collection time of previous frequency-reduction data and a preset frequency-reduction time interval; and extracting the positioning data as frequency-reduction data when it is determined that the collection time of the positioning data is longer than or equal to the target collection time.

6 Claims, 6 Drawing Sheets

(56) References Cited

U.S. PATENT DOCUMENTS

2021/0308576 A1* 10/2021 Upton .................. A63F 13/352
2021/0400092 A1   12/2021 Hu
2022/0014884 A1*  1/2022 Szablya .................. H04Q 9/00

* cited by examiner

FIG. 6

DATA PROCESSING METHOD AND APPARATUS, SERVER, AND COMPUTER-READABLE STORAGE MEDIUM

CROSS-REFERENCE TO RELATED APPLICATIONS

The present application claims priority to Chinese Patent Application No. 202110153361.X with a filing date of Feb. 4, 2021. The content of the aforementioned application, including any intervening amendments thereto, is incorporated herein by reference.

TECHNICAL FIELD

The embodiments of the present application relate to data processing technologies, and particularly to a data processing method and apparatus, a server, and a computer-readable storage medium.

DESCRIPTION OF RELATED ART

In a geographic location aggregation service, a server receives positioning data from a number of vehicles simultaneously, and the amount of positioning data to be processed is huge and far exceeds the processing capacity of the server, so a method of frequency reduction on the positioning data is used to guarantee the quality of data processing at present.

The positioning data from the same vehicle is frequency-based reduced in the following way in the related art: obtaining positioning data from a message queue cluster, and extracting a plurality of positioning data with a fixed time interval at collection time as frequency-reduction data. However, in a process of obtaining the positioning data, a plurality of positioning data may be obtained from one message queue simultaneously, resulting in the obtained positioning data not being strictly arranged in sequence according to the collection time, and thus the accuracy of a time sequence of the frequency-reduction data determined thereon is poor.

SUMMARY OF PRESENT INVENTION

The present application provides a data processing method and apparatus, a server, and a computer-readable storage medium, to guarantee the accuracy of a time sequence of the frequency-reduction data.

An embodiment of the present application provides a data processing method, including:
 obtaining positioning data of a moving object from a message queue cluster;
 comparing collection time of the positioning data with target collection time when frequency-reduction data to be determined is not arranged first, where the target collection time is determined according to collection time of previous frequency-reduction data and a preset frequency-reduction time interval; and
 extracting the positioning data as frequency-reduction data when it is determined that the collection time of the positioning data is longer than or equal to the target collection time.

An embodiment of the present application further provides a data processing apparatus, including:
 a data obtaining module configured to obtain positioning data of a moving object from a message queue cluster;
 a time comparison module configured to compare collection time of the positioning data with target collection time when frequency-reduction data to be determined is not arranged first, where the target collection time is determined according to collection time of previous frequency-reduction data and a preset frequency-reduction time interval; and
 a data determination module configured to extract the positioning data as frequency-reduction data when it is determined that the collection time of the positioning data is longer than or equal to the target collection time.

An embodiment of the present application further provides a server, including: one or more processors; and a memory configured to store one or more programs; when the one or more programs are executed by the one or more processors, the one or more processors implement the above data processing method.

An embodiment of the present application provides a computer-readable storage medium, storing a computer program, where the program implements the above data processing method when executed by a processor.

BRIEF DESCRIPTION OF THE DRAWINGS

The accompanying drawings used for describing the embodiments are described as follows.

DESCRIPTION OF THE EMBODIMENTS

In conjunction with the accompanying drawings and embodiments, specific implementations, structures, features, and effects of a data processing method and apparatus, a server, and a computer-readable storage medium according to the present application are described below.

An embodiment of the present application provides a data processing method, including:
 obtaining positioning data of a moving object from a message queue cluster;
 comparing collection time of the positioning data with target collection time when frequency-reduction data to be determined is not arranged first, where the target collection time is determined according to collection time of previous frequency-reduction data and a preset frequency-reduction time interval; and
 extracting the positioning data as frequency-reduction data when it is determined that the collection time of the positioning data is longer than or equal to the target collection time.

According to the technical solution provided in the embodiments of the present application, the positioning data of the moving object is obtained from the message queue cluster, and the collection time of the positioning data is compared with the target collection time when the frequency-reduction data to be determined is not arranged first, where the target collection time is determined according to the collection time of the previous frequency-reduction data and the preset frequency-reduction time interval, and the positioning data is extracted as the frequency-reduction data when it is determined that the collection time of the positioning data is longer than or equal to the target collection time, such that it is guaranteed that the collection time of the frequency-reduction data is arranged in sequence and approximately at equal intervals, and the uniformity of the frequency-reduction data and the accuracy of a time sequence are improved.

What is described above is a core idea of the present application, the technical solutions in the embodiments of the present application will be described below clearly and comprehensively in conjunction with the accompanying drawings of the embodiments of the present application. Based on the embodiments of the present application, all other embodiments obtained by those of ordinary skill in the art without making creative efforts fall within the scope of protection of the present application.

In the following description, numerous details are set forth in order to provide a thorough understanding of the present application. However, the present application may be implemented otherwise than as specifically described herein. Those skilled in the art can make similar developments without departing from the spirit of the present application, and therefore the present application is not to be limited by the specific embodiments disclosed below.

Furthermore, the present application is described in detail in conjunction with the schematic diagrams. When the embodiments of the present application are described in detail, for the convenience of description, the schematic diagrams representing device structures are not partially enlarged according to a general scale, and the schematic diagrams are merely examples, which should not limit the scope of protection of the present application. Moreover, three-dimensional sizes of length, width and height should be included in actual production.

Figure 1:
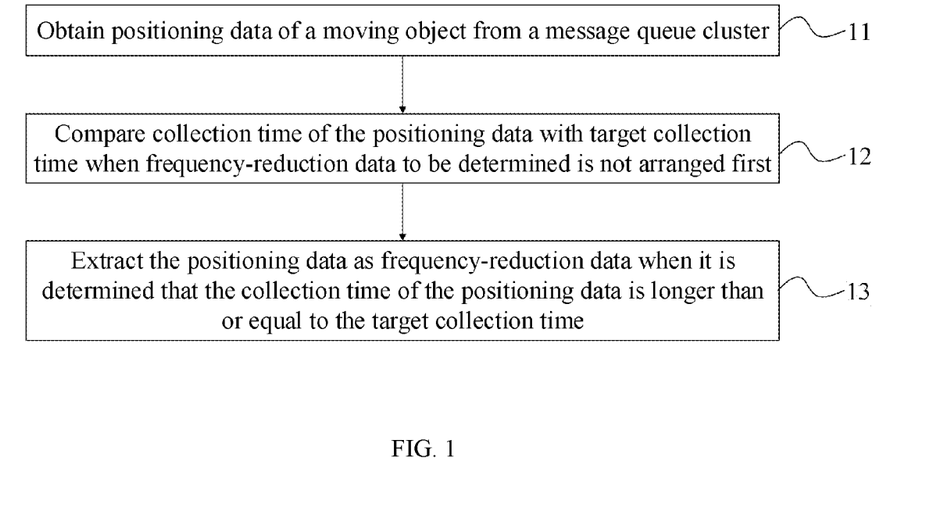
FIG. 1 is a schematic flowchart showing a data processing method according to an embodiment of the present application.

FIG. 1 is a schematic flowchart showing a data processing method according to an embodiment of the present application. The method in the embodiment may be performed by a data processing apparatus, the data processing apparatus may be implemented in a form of hardware and/or software, may generally be integrated in a server for data processing, and is configured to directly or indirectly provide frequency-reduction data obtained after data processing for a client installed in a terminal. The terminal may include, but is not limited to, any one of a mobile phone, a tablet computer, or a vehicle-mounted terminal.

With reference to FIG. 1, the data processing method according to an embodiment of the present application may include:

Step 11, obtaining positioning data of a moving object from a message queue cluster.

The moving object may be, for example, a vehicle, for example, a commercial vehicle. It can be understood that in other implementations of the embodiment, the moving object may also be any other movable object that can obtain positioning data, which is not limited in the embodiment.

The message queue cluster includes a plurality of message queues. The message queues are positioning data queues, and the positioning data is position information of the moving object, for example, latitude and longitude, etc.

The message queue cluster includes positioning data of a plurality of moving objects connected to the same server. It can be understood that the message queues in the message queue cluster parse the added positioning data, and the parsed positioning data in any message queue is obtained at a data obtaining moment. Illustratively, the message queue cluster includes a first message queue. The positioning data is obtained from the first message queue at a preset interval of 1 s, that is, the positioning data is obtained from the first message queue at a frequency of 1 Hz. The positioning data is obtained from the first message queue at the 1st s and the 2nd s. The first message queue completes parsing 3 positioning data within a period of time from the 1st s to the 2nd s, and the 3 positioning data are obtained from the first message queue at the 2nd s simultaneously, where the 1st s and the 2nd s are both data obtaining moments.

Step 12, comparing collection time of the positioning data with target collection time when frequency-reduction data to be determined is not arranged first, where the target collection time is determined according to collection time of previous frequency-reduction data and a preset frequency-reduction time interval.

Illustratively, the first positioning data obtained from the message queue cluster is used as frequency-reduction data arranged first in sequence, that is, the first frequency-reduction data. The technical solution of the embodiment mainly focuses on a manner of determining other frequency-reduction data except for the first frequency-reduction data.

Frequency-reduction processing is to periodically extract the positioning data obtained in Step 11, and the extracted positioning data is used as the frequency-reduction data. The target collection time is a sum of the collection time of the previous frequency-reduction data and the preset frequency-reduction time interval. The collection time of the (n−1)th frequency-reduction data is $P_{n-1}$, the preset frequency-reduction time interval is m, the collection time of the nth frequency-reduction data is $P_n$, and then $P_n = P_{n-1} + m$, where both n and m are positive integers greater than or equal to 1. It can be understood that the collection time of the sequentially obtained positioning data is not necessarily arranged in sequence. When positioning data with collection time longer than the target collection time appears before positioning data with collection time equal to the target collection time, a time interval between the collection time of the frequency-reduction data determined this time and the collection time of the previous frequency-reduction data is certainly longer than the preset frequency-reduction time interval, such that collection time interval of adjacent frequency-reduction data is longer than or equal to the preset frequency-reduction time interval. Accordingly, the preset frequency-reduction time interval is a minimum time interval of the collection time of the adjacent frequency-reduction data.

Illustratively, the preset frequency-reduction time interval may have a value in a range of 15 s-17 s. It can be understood that a too long preset frequency-reduction time interval may cause a too low density of the frequency-reduction data, then the accuracy of a fitting result is low in a historical track fitting application of the positioning data, and real-time performance of the positioning data is poor in a real-time positioning application of the positioning data. A too short preset frequency-reduction time interval may cause huge amounts of positioning data to be processed, and a frequency-reduction processing effect of the positioning data cannot be guaranteed. Experiments show that when the preset frequency-reduction time interval is in a range of 15 s-17 s, the accuracy of a historical track fitted based on the positioning data is desirable, the accuracy of the real-time positioning based on the positioning data is favorable and the frequency-reduction processing effect of the positioning data is satisfactory.

It should be noted that in the embodiment, the comparison in Step 12 is performed for the positioning data of the same moving object, and there is no comparison step between different moving objects.

When a plurality of positioning data are obtained at the same data obtaining moment, the collection time of all positioning data is compared with the target collection time in sequence according to a sequence of the collection time of the plurality of positioning data.

Step 13, extracting the positioning data as frequency-reduction data when it is determined that the collection time of the positioning data is longer than or equal to the target collection time.

The comparison results in Step 12 include the following two cases: 1. the collection time of the positioning data is longer than or equal to the target collection time; and 2. the collection time of the positioning data is shorter than the target collection time. When a comparison result is the case 1, the positioning data is extracted as the frequency-reduction data, and when a comparison result is the case 2, the positioning data is discarded. It should be noted that the discarded positioning data is not directly deleted, but flows to another processing path for other application processing related to a geographic location.

Illustratively, the positioning data with the collection time of 6 s is the previous frequency-reduction data, three positioning data simultaneously obtained from the first message queue are A, B and C, the collection time of A, B and C is arranged in sequence, the collection time of A, B and C is, for example, 21 s, 22 s and 23 s, and the preset frequency-reduction time interval is 16 s. Then the target collection time of A, B and C is 6 s+16 s=22 s. The collection time of A, that is, 21 s, is compared with 22 s, the collection time of A is shorter than the target collection time, and A is discarded. The collection time of B, that is, 22 s is compared with 22 s, the collection time of B is equal to the target collection time, and B is determined as the current frequency-reduction data. In this case, the target collection time is updated to 22 s+16 s=38 s. The collection time of C, that is, 23 s is compared with 38 s, the collection time of C is shorter than the target collection time, and C is discarded. It is to be noted that when the collection time of B is not 22 s but 24 s, since 24 s is longer than the target collection time of 22 s compared with B, the positioning data with the collection time of 24 s will be determined as the current frequency-reduction data, and then, the target collection time is updated to 24 s+16 s=40 s.

It should be noted that the collection time is time when a data collection apparatus collects the positioning data from the moving object, and has nothing to do with the time when the positioning data is obtained from the message queue cluster, that is, the data obtaining moment, and the two are timed respectively.

According to the technical solution provided in the embodiment, the positioning data of the moving object is obtained from the message queue cluster, the collection time of the positioning data is compared with the target collection time when the frequency-reduction data to be determined is not arranged first, where the target collection time is determined according to the collection time of the previous frequency-reduction data and the preset frequency-reduction time interval, and the positioning data is extracted as the frequency-reduction data when it is determined that the collection time of the positioning data is longer than or equal to the target collection time. Therefore, in the case that the collection time of the positioning data obtained from the message queue cluster is not arranged in sequence, the manner of determining the frequency-reduction data in the embodiment can still guarantee that the collection time of the frequency-reduction data determined sequentially is arranged in sequence, and the problem of time sequence disorder does not occur. On the other hand, the setting of the preset frequency-reduction time interval guarantees that a difference between the collection time of adjacent frequency-reduction data is not too large, such that a better uniformity of the frequency-reduction data is realized.

Figure 2:
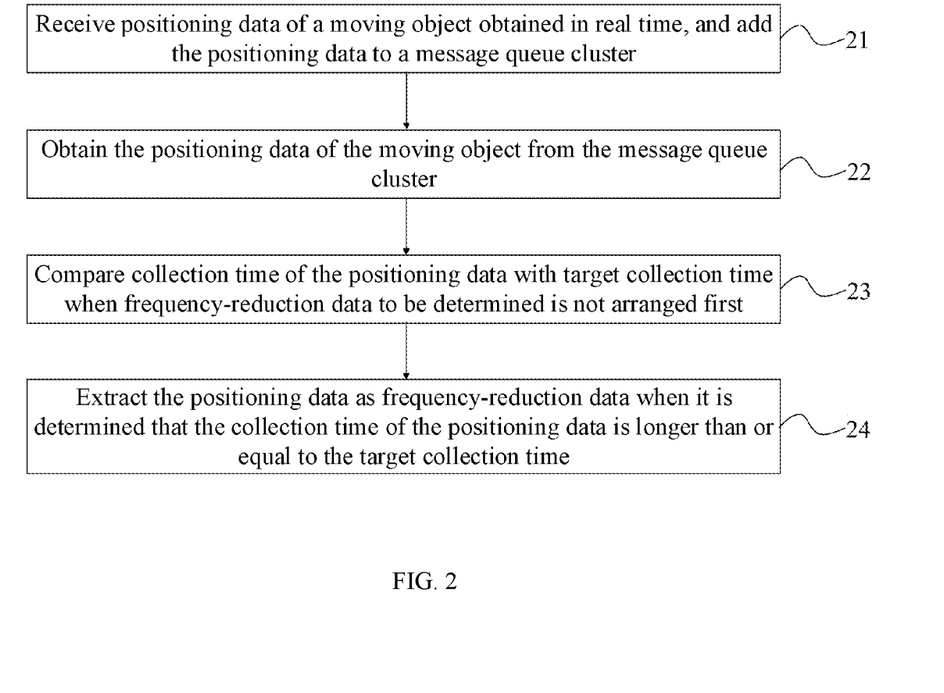
FIG. 2 is a schematic flowchart showing another data processing method according to an embodiment of the present application.

FIG. 2 is a schematic flowchart showing another data processing method according to an embodiment of the present application. The embodiment describes the data processing method based on the technical solutions of the above embodiments. As shown in FIG. 2, the data processing method according to the embodiment may include:

Step 21, receiving positioning data of a moving object obtained in real time, and adding the positioning data to a message queue cluster.

The real-time collection and addition of the positioning data improve the real-time performance of the positioning data in the message queue cluster. In the embodiment, an interval between the collection time of adjacent frequency-reduction data is short, and the latest frequency-reduction data may be used for real-time positioning of the moving object. Moreover, the determined frequency-reduction data may be used for generating a historical track, so as to simultaneously display a current position and the historical track of the moving object.

It can be understood that the positioning data is generated in real time during the movement of the moving object, the real-time positioning data of the moving object is collected by a data collection apparatus, and uploaded to a server for storage in a form of message queue cluster. The message queue in the message queue cluster parses the positioning data added therein, and after parsing, the server extracts the positioning data to determine the frequency-reduction data.

Step 22, obtaining the positioning data of the moving object from the message queue cluster.

Step 23, comparing collection time of the positioning data with target collection time when frequency-reduction data to be determined is not arranged first, where the target collection time is determined according to collection time of previous frequency-reduction data and a preset frequency-reduction time interval.

Step 24, extracting the positioning data as frequency-reduction data when it is determined that the collection time of the positioning data is longer than or equal to the target collection time.

According to the technical solution provided in the embodiment, the positioning data of the moving object is obtained from the message queue cluster by receiving the positioning data of the moving object obtained in real time and adding the positioning data to the message queue cluster. The collection time of the positioning data is compared with the target collection time when the frequency-reduction data to be determined is not arranged first, where the target collection time is determined according to the collection time of the latest frequency-reduction data and the preset frequency-reduction time interval, and the positioning data is extracted as the frequency-reduction data when it is determined that the collection time of the positioning data is longer than or equal to the target collection time, such that it is guaranteed that the collection time of the frequency-reduction data is arranged in sequence and approximately at equal intervals, and the uniformity of the frequency-reduction data and the accuracy of a time sequence are improved. On this basis, the real-time performance of the frequency-reduction data is improved, so as to achieve the real-time positioning and the historical track generation accurately.

Illustratively, the step of obtaining positioning data of a moving object from a message queue cluster may include: obtaining the positioning data of the moving object from the message queue cluster at a preset frequency, where the preset frequency is greater than 1 Hz.

The addition and obtaining of the positioning data in the message queue cluster are performed synchronously, that is, when the server obtains the positioning data from the message queue cluster, the server also adds the real-time positioning data received from the data collection apparatus to the message queue cluster, and parses the positioning data. In the embodiment, the frequency of obtaining the positioning data of the moving object from the message queue cluster is relatively fast, which avoids the accumulation of the positioning data parsed in the message queue, and is beneficial to improve the sequence of the collection time of the positioning data obtained from the message queue cluster, so as to reduce a time difference between the collection time of the determined frequency-reduction data and the corresponding target collection time, further improving the uniformity of the frequency-reduction data, and enhancing the accuracy of the historical track obtained based on frequency-reduction data fitting.

Alternatively, a multi-thread mode may be used for obtaining positioning data of a moving object from a message queue cluster.

Compared with a single-thread mode, the multi-thread mode can accelerate a data processing capability, and cooperate with the message queue cluster to increase an overall data throughput of the server.

Figure 3:
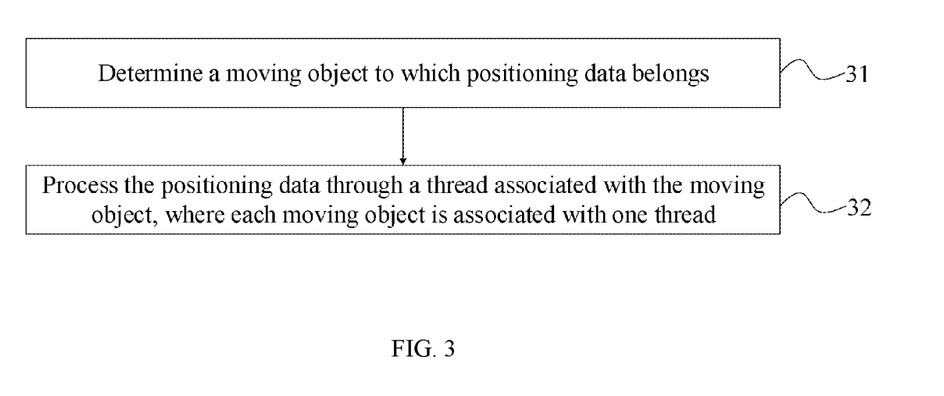
FIG. 3 is a schematic flowchart showing a method for obtaining positioning data of a moving object from a message queue cluster in a multi-thread mode according to an embodiment of the present application.

FIG. 3 is a schematic flowchart showing a method for obtaining positioning data of a moving object from a message queue cluster in a multi-thread mode according to an embodiment of the present application. Based on the foregoing embodiments, the embodiment describes the step of obtaining positioning data of a moving object from a message queue cluster in a multi-thread mode.

With reference to FIG. 3, the step of obtaining positioning data of a moving object from a message queue cluster in a multi-thread mode may include:

Step 31, determining the moving object to which the positioning data belongs.

The moving object to which the positioning data belongs is the moving object that generates the positioning data. For example, a moving vehicle K generates positioning data L in real time, and the moving object to which the positioning data L belongs is the vehicle K.

Step 32, processing the positioning data through a thread associated with the moving object, where each moving object is associated with one thread.

An association between the moving object and the thread is as follows: the positioning data of the moving object is processed by and only by a thread associated with the positioning data, the association is stored in the server, and in the process of obtaining the positioning data by the thread, it can be determined whether the to-be-obtained positioning data is generated by the moving object associated with the positioning data based on the association.

For example, the multiple threads include threads E and G, the moving objects include H, I and J. The thread associated with the moving objects H and I is E, the thread associated with the moving object J is G. The threads E and G obtain the positioning data from the message queue cluster, the thread E is to obtain the positioning data T, and determines whether the positioning data T belongs to H or I in advance. If so, the positioning data T is extracted to determine the frequency-reduction data, and if not, the positioning data T is discarded.

Each thread may be associated with one or more moving objects, and preferably, each thread is associated with a plurality of moving objects, so as to avoid too many threads that are difficult to control.

When multiple threads simultaneously process the positioning data of the same moving object, it is likely to cause the problem of dense distribution of local frequency-reduction data. For example, when the threads E and F simultaneously process the positioning data of the moving object H, the following situation may occur: the threads E and F obtain the positioning data of the moving object H with the collection time of 6 s and 7 s respectively, the current target collection time is 5 s, and then the threads E and F almost simultaneously determine that the positioning data with the collection time of 6 s and 7 s are the frequency-reduction data, resulting in two frequency-reduction data with the collection time close to each other in the frequency-reduction data queue, which affects the uniformity of the frequency-reduction data. Each moving object is associated with one thread, such that the positioning data of the same moving object can be processed by a fixed thread, the problem of dense distribution of local frequency-reduction data which is easy to occur when the positioning data of the same moving object is processed by multiple threads simultaneously is avoided, and the uniformity of the frequency-reduction data is improved.

Figure 4:
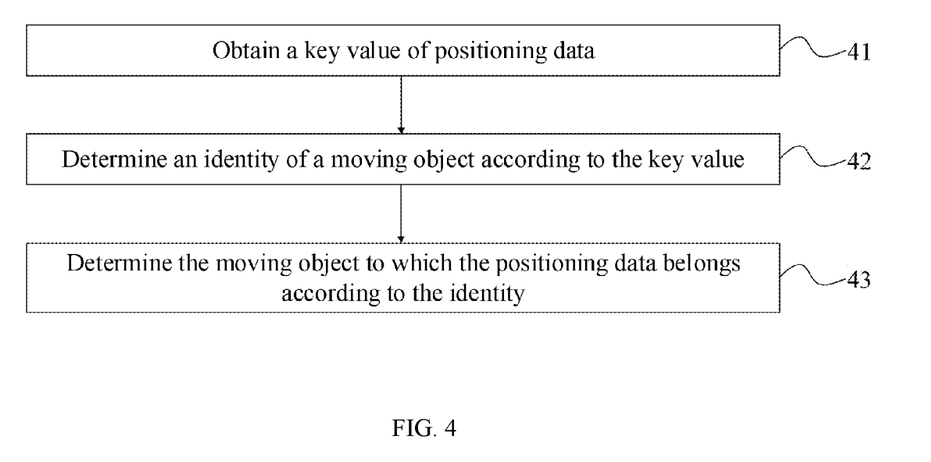
FIG. 4 is a schematic flowchart showing a method for determining a moving object to which positioning data belongs according to an embodiment of the present application.

FIG. 4 is a schematic flowchart showing a method for determining a moving object to which positioning data belongs according to an embodiment of the present application. Based on the above embodiments, the embodiment describes the step of determining a moving object to which positioning data belongs.

With reference to FIG. 4, the step of determining a moving object to which positioning data belongs may include:

Step 41, obtaining a key value of the positioning data.

The key value may be set according to actual needs and is easy to obtain. It is an optional way to mark a category of the positioning data. A classification method may be achieved by setting a content of the key value.

Step 42, determining an identity of the moving object according to the key value.

Preferably, the identity of the moving object is used as the key value of the positioning data. For example, the identity of the moving object H is ID1, and ID1 is used as the key value of the positioning data generated by the moving object H. In this way, after the key value of the positioning data is obtained, when the key value is ID1, it may be determined that the identity of the moving object of the positioning data is ID1.

It can be understood that the positioning data may be cached based on the key value of the positioning data, to form a positioning data cache queue corresponding to the moving object one to one, so as to facilitate the processing of the positioning data by the thread associated with the moving object.

Step 43, determining the moving object to which the positioning data belongs according to the identity.

The example mentioned in Step 42 is still used for illustration, the identity corresponds one-to-one to the moving object and has unique certainty. When it is determined that the identity is Dl, it can be determined that the moving object generating the positioning data is the moving object H.

The positioning data is cached by using the identity of the moving object as the key value, such that the positioning data can be grouped accurately and quickly, and the positioning data of each moving object is guaranteed to be processed only by the thread associated with the moving object.

Based on the foregoing embodiments, the embodiment provides an example of an alternative data processing method, which is described by taking a vehicle as a moving object as an example.

The data processing method according to the embodiment is executed by a server, and before the server executes the data processing method, the method includes: collecting positioning data of each vehicle from the running vehicles by a plurality of data collection apparatuses, where the positioning data of each vehicle is collected by one data collection apparatus associated with the vehicle, and each data collection apparatus may collect the positioning data of one or more vehicles. A data collection mode may be to collect real-time positioning data from a positioning apparatus such as a global position system (GPS) positioning apparatus in the vehicle.

The data collection apparatus uploads the collected positioning data to the server in a form of a data packet, and the server adds the received positioning data in the form of the data packet to a message queue cluster, for example, a Kafka message queue cluster. Kafka is an open-source stream processing platform and a distributed publish-subscribe messaging system with high throughput, and can process all action stream data in the server, to improve the positioning data throughput of the server, and improve a data processing capability of the server.

The server executes the data processing method according to the embodiment as follows: the server obtains the positioning data of the vehicle from the Kafka message queue cluster in a multi-thread mode and at a preset frequency. Each thread is associated with a plurality of vehicles, and each cache is associated with one thread. A cache queue of the positioning data is formed by using an identity of each vehicle as a key value. The thread identifies the key value of the positioning data to be obtained, and determines whether the positioning data to be obtained is generated by the vehicle associated with the positioning data according to the key value. If so, the positioning data is obtained, or otherwise, the positioning data is discarded, and the key value of next positioning data is identified.

Any thread processes the positioning data of any vehicle associated with the thread as follows: when frequency-reduction data to be determined is not arranged first, collection time of currently obtained positioning data is compared with target collection time, that is, the collection time of the currently obtained positioning data is compared with a sum of collection time of previous frequency-reduction data and a preset frequency-reduction time interval. When it is determined that the collection time of the currently obtained positioning data is longer than or equal to the sum of the collection time of the previous frequency-reduction data and the preset frequency-reduction time interval, the positioning data is extracted as the current frequency-reduction data, that is, the latest frequency-reduction data. When it is determined that the collection time of the currently obtained positioning data is shorter than the sum of the collection time of the previous frequency-reduction data and the preset frequency-reduction time interval, the positioning data is discarded and a comparison of the next positioning data is performed.

Sample numerical values are used for illustrating a manner in which the thread processes the positioning data as follows: the preset frequency-reduction time interval is 15 s, the positioning data is obtained from the Kafka message queue cluster at a frequency of 1 s/time, the collection time of the obtained positioning data is, for example, 1 s, 3 s, 4 s, 2 s, 6 s, 5 s, 7 s, 8 s, 9 s, 10 s, 12 s, 14 s, 13 s, 11 s, 15 s, and 16 s in sequence. When the positioning data with the collection time of 1 s is obtained, the positioning data is the first obtained positioning data, which is used as the first frequency-reduction data. Based on the preset time interval of 15 s and the collection time of the previous frequency-reduction data being 1 s, the target collection time may be obtained as 16 s. After the positioning data with the collection time of 3 s, 4 s, 2 s, 6 s, 5 s, 7 s, 8 s, 9 s, 10 s, 12 s, 14 s, 13 s, 11 s and 15 s are obtained, 3 s, 4 s, 2 s, 6 s, s, 7 s, 8 s, 9 s, 10 s, 12 s, 14 s, 13 s, 11 s, 15 s are compared with 16 s, then 3 s, 4 s, 2 s, 6 s, 5 s, 7 s, 8 s, 9 s, 10 s, 12 s, 14 s, 13 s, 11 s, and 15 s are all shorter than 16 s, and the positioning data with the collection time of 3 s, 4 s, 2 s, 6 s, 5 s, 7 s, 8 s, 9 s, s, 12 s, 14 s, 13 s, 11 s and 15 s are discarded. 16 s is equal to 16 s, the positioning data with the collection time of 16 s is extracted as the second frequency-reduction data. The third frequency-reduction data, the fourth frequency-reduction data . . . are determined in the above manner in sequence.

An actual experiment proves that an error of a difference between the collection time of the adjacent frequency-reduction data is shorter than 1 s, which proves that the frequency-reduction data distribution is extremely uniform.

The collection time interval between the adjacent frequency-reduction data is small, and based on real-time collection of positioning data of the vehicle, the latest frequency-reduction data may be used for real-time positioning, and a historical track of the vehicle may be obtained based on fitting of the plurality of frequency-reduction data.

The data processing method according to the embodiment may be used for a cache-aggregation-invocation service of GPS geographic location, supports integration of components such as a message queue, a MongoDB database, a cache database, a configuration file, and log management based on the open-source Spring Boot service framework, and improves data response and a data flow rate while guaranteeing an acceptable frequency-reduction range.

Figure 5:
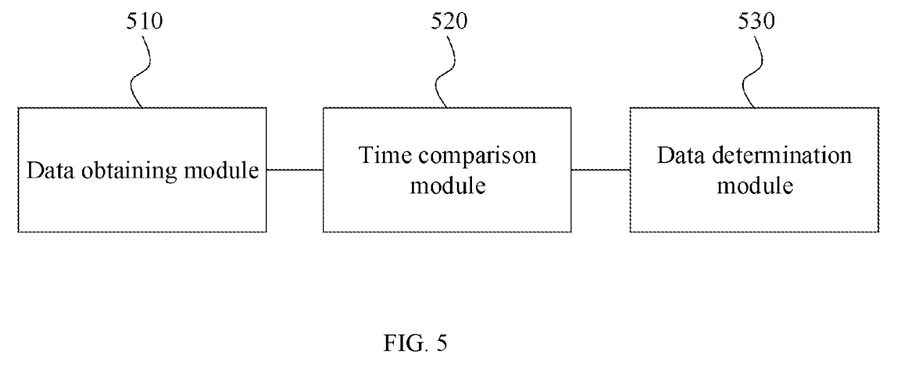
FIG. 5 is a schematic structural diagram showing a data processing apparatus according to an embodiment of the present application.

FIG. 5 is a schematic structural diagram showing a data processing apparatus according to an embodiment of the present application. As shown in FIG. 5, the data processing apparatus may include:

a data obtaining module 510 configured to obtain positioning data of a moving object from a message queue cluster;

a time comparison module 520 configured to compare collection time of the positioning data with target collection time when frequency-reduction data to be determined is not arranged first, where the target collection time is determined according to collection time of previous frequency-reduction data and a preset frequency-reduction time interval; and a data determination module 530 configured to extract the positioning data as frequency-reduction data when it is determined that the collection time of the positioning data is longer than or equal to the target collection time.

Based on the above solutions, the data processing apparatus further includes:

a data addition module configured to receive positioning data of a moving object obtained in real time, and add the positioning data to a message queue cluster before obtaining the positioning data of the moving object from the message queue cluster.

The data obtaining module 510 is specifically configured to obtain the positioning data of the moving object from the message queue cluster at a preset frequency, where the preset frequency is greater than 1 Hz.

The data obtaining module 510 is specifically configured to obtain the positioning data of the moving object from the message queue cluster in a multi-thread mode.

The data obtaining module 510 includes: a moving object determination unit configured to determine the moving object to which the positioning data belongs; and a data processing unit configured to process the positioning data through a thread associated with the moving object, where each moving object is associated with one thread.

The moving object determination unit includes: a key value obtaining sub-unit configured to obtain a key value of the positioning data; an identity determination sub-unit configured to determine an identity of the moving object according to the key value; and an object determination sub-unit configured to determine the moving object to which the positioning data belongs according to the identity.

Figure 6:
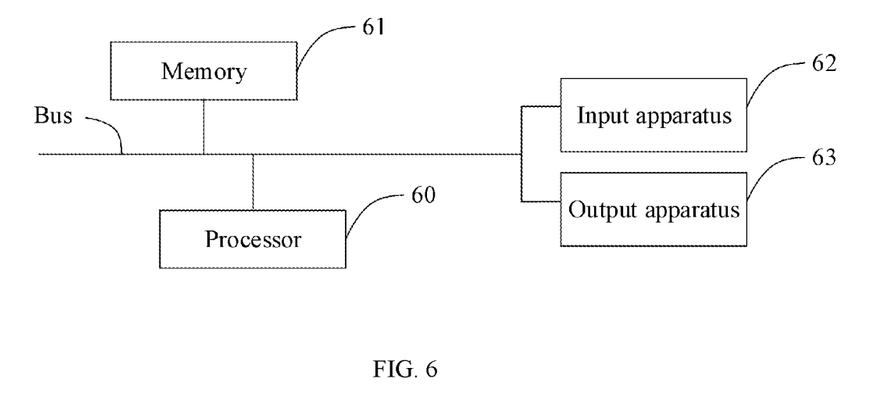
FIG. 6 is a schematic structural diagram showing a server according to an embodiment of the present application.

FIG. 6 is a schematic structural diagram showing a server according to an embodiment of the present application. As shown in FIG. 6, the server includes a processor 60, a memory 61, an input apparatus 62, and an output apparatus 63. The number of processor 60 in the server may be one or more, and one processor 60 is taken as an example in FIG. 6. The processor 60, the memory 61, the input apparatus 62, and the output apparatus 63 in the server may be connected through a bus alternatively in other manners. In FIG. 6, connection through a bus is taken as an example.

The memory 61, as a computer-readable storage medium, may be configured to store a software program, a computer-executable program and a module, such as a program instruction/module corresponding to the data processing method in the embodiments of the present application (for example, the data processing apparatus includes a data obtaining module 510, a time comparison module 520, and a data determination module 530). The processor 60 executes various functional applications and data processing of the server, that is, implements the above data processing method, by running a software program, an instruction and a module stored in the memory 61.

The memory 61 may mainly include a program storage area and a data storage area. The program storage area may store an operation system and an application program required by at least one function. The data storage area may store data created from the use of a terminal, etc. Moreover, the memory 61 may include a high-speed random access memory, and may further include a non-volatile memory, for instance, at least one disk storage device, a flash memory device, or other non-volatile solid-state storage devices. In some examples, the memory 61 may further include a memory remotely arranged with respect to the processor 60, and the remote memory may be connected to the server through a network. Examples of the network described above include, but are not limited to, the Internet, an enterprise intranet, a local area network, a mobile communication network, and a combination thereof.

The input apparatus 62 may receive input numeric or character information and generate key signal input related to user settings and function control of the server. The output apparatus 63 may include a display server such as a display screen.

An embodiment of the present application further provides a storage medium containing a computer-executable instruction. The computer-executable instruction is configured to execute a data processing method when executed by a computer processor. The method includes:

obtaining positioning data of a moving object from a message queue cluster;

comparing collection time of the positioning data with target collection time when frequency-reduction data to be determined is not arranged first, where the target collection time is determined according to collection time of previous frequency-reduction data and a preset frequency-reduction time interval; and extracting the positioning data as frequency-reduction data when it is determined that the collection time of the positioning data is longer than or equal to the target collection time.

Certainly, in the storage medium containing a computer-executable instruction according to the embodiment of the present application, the computer-executable instruction is not limited to the method operations described above, and may also execute related operations in the data processing method according to any embodiment of the present application.

From the description of the above implementations, it will be apparent to those skilled in the art that the present application may be achieved through software and necessary general-purpose hardware, and certainly may also be achieved through hardware, but in many cases the former is a better implementation. Based on such understanding, the technical solution provided in the present application may be embodied in a form of a software product in essence or a part contributing to the prior art, and the computer software product may be stored in a computer-readable storage medium, for example, a floppy disk, a read-only memory (ROM), a random access memory (RAM), a flash memory (FLASH), a hard disk or an optical disk of a computer, and includes several instructions for making a computer device (may be a personal computer, a server or a network device) execute the method of each embodiment of the present application.

It should be noted that in the above embodiments of the data processing apparatus, the units and modules included are only divided according to functional logic, but are not limited to the above division, as long as corresponding functions can be implemented. Moreover, the names of the functional units are only used for distinguishing one another, and are not intended to limit the scope of protection of the present application.

What is claimed is:

1. A data processing method, comprising:

obtaining positioning data of a moving object from a message queue cluster in a multi-thread mode;

comparing collection time of the positioning data with target collection time when frequency-reduction data to be determined is not arranged first, wherein the target collection time is determined according to collection time of previous frequency-reduction data and a preset frequency-reduction time interval; and extracting the positioning data as frequency-reduction data when it is determined that the collection time of the positioning data is longer than or equal to the target collection time; wherein the collection time of the positioning data obtained from the message queue cluster is arranged in a non-sequential manner;

the obtaining positioning data of a moving object from a message queue cluster in a multi-thread mode comprises:

determining the moving object to which the positioning data belongs; and processing the positioning data through a thread associated with the moving object, wherein each moving object is associated with one thread; and the determining the moving object to which the positioning data belongs comprises:

obtaining a key value of the positioning data;

determining an identity of the moving object according to the key value; and determining the moving object to which the positioning data belongs according to the identity.

2. The data processing method according to claim 1, wherein before the obtaining positioning data of a moving object from a message queue cluster, the method further comprises:

receiving the positioning data of the moving object obtained in real time, and adding the positioning data to the message queue cluster.

3. The data processing method according to claim 1, wherein the obtaining positioning data of a moving object from a message queue cluster comprises:

obtaining the positioning data of the moving object from the message queue cluster at a preset frequency, wherein the preset frequency is greater than 1 Hz.

4. The data processing method according to claim 1, wherein the preset frequency-reduction time interval has a value in a range of 15 s-17 s.

5. A server, comprising:

one or more processors; and a memory configured to store one or more programs; wherein when the one or more programs are executed by the one or more processors, the one or more processors implement the data processing method according to claim 1.

6. A non-transitory computer-readable storage medium, storing a computer program, wherein the program implements the data processing method according to claim 1 when executed by a processor.

\* \* \* \* \*